US012603958B2

(12) United States Patent
Tan et al.

(10) Patent No.: US 12,603,958 B2
(45) Date of Patent: Apr. 14, 2026

(54) SYSTEM AND METHOD OF LARGE-SCALE NETWORKING EXTENDED CASCADED MICROPHONES

(71) Applicant: SHEN ZHEN PROITAV TECHNOLOGY CO. LTD., Shenzhen (CN)

(72) Inventors: Hao Tan, Shenzhen (CN); Junjie Xie, Shenzhen (CN); Jia Cao, Shenzhen (CN)

(73) Assignee: SHEN ZHEN PROITAV TECHNOLOGY CO. LTD., Shenzhen (CN)

( * ) Notice: Subject to any disclaimer, the term of this patent is extended or adjusted under 35 U.S.C. 154(b) by 148 days.

(21) Appl. No.: 18/763,270

(22) Filed: Jul. 3, 2024

(65) Prior Publication Data

US 2024/0357039 A1     Oct. 24, 2024

Related U.S. Application Data

(63) Continuation-in-part of application No. PCT/CN2023/132757, filed on Nov. 20, 2023.

(30) Foreign Application Priority Data

Dec. 5, 2022     (CN) ........................ 202211549335.X

(51) Int. Cl.
| | |
|---|---|
| *H04M 3/00* | (2024.01) |
| *H04M 3/56* | (2006.01) |
| *H04R 3/00* | (2006.01) |

(52) U.S. Cl.
CPC ............ *H04M 3/568* (2013.01); *H04R 3/005* (2013.01)

(58) Field of Classification Search
CPC ............................... H04M 3/568; H04R 3/005
(Continued)

(56) References Cited

U.S. PATENT DOCUMENTS

| | | | | |
|---|---|---|---|---|
| 6,173,059 B1 * | 1/2001 | Huang | ................... | H04R 1/406 |
| | | | | 379/202.01 |
| 11,510,003 B1 * | 11/2022 | Saplakoglu | ............. | H04S 7/301 |

(Continued)

FOREIGN PATENT DOCUMENTS

| | | |
|---|---|---|
| CN | 210297835 U | 4/2020 |
| CN | 112929594 A | 6/2021 |

(Continued)

OTHER PUBLICATIONS

International Search Report for International Application No. PCT/CN2023/132757; Mailing Date, Feb. 29, 2024.

(Continued)

*Primary Examiner* — William J Deane, Jr.

(74) *Attorney, Agent, or Firm* — CANTOR COLBURN LLP

(57) ABSTRACT

A system and a method of large-scale networking extended cascaded microphones including: a plurality of cascaded microphones configured for picking up a sound and completing an audio processing according to a reference audio signal received from the cascaded Hub of a superior device after the sound is picked up, and sending processed sound data to the cascaded Hub of the superior device; a cascaded Hub configured for comparing energies after the sound data uploaded by one or more cascaded microphones of a subordinate device are received, and sending the sound data with a maximum energy to the conference integrated machine of the superior device; and a conference integrated machine configured for completing an audio processing (Continued)

according to an audio signal received from a PC machine as a reference audio signal after the sound is picked up.

7 Claims, 4 Drawing Sheets

(58) Field of Classification Search
USPC .............................................. 379/202.01, 158
See application file for complete search history.

(56) References Cited

U.S. PATENT DOCUMENTS

| | | | |
|---|---|---|---|
| 2005/0286443 A1 | 12/2005 | Mcmillen et al. | |
| 2008/0285770 A1* | 11/2008 | Wu ......................... | H04R 1/406 |
| | | | 381/92 |
| 2011/0063406 A1* | 3/2011 | Albert ..................... | H04M 3/56 |
| | | | 348/14.09 |
| 2014/0064519 A1* | 3/2014 | Silfvast .................... | G10H 1/18 |
| | | | 381/119 |

| | | | |
|---|---|---|---|
| 2018/0035222 A1 | 2/2018 | Anderson | |
| 2018/0227666 A1 | 8/2018 | Barnett et al. | |
| 2020/0107137 A1* | 4/2020 | Koutrouli ............ | H04R 25/407 |
| 2023/0328430 A1* | 10/2023 | Cattani .................. | H04R 1/406 |
| 2024/0073608 A1* | 2/2024 | Haddad .................. | H04R 3/005 |

FOREIGN PATENT DOCUMENTS

| | | |
|---|---|---|
| CN | 113411719 A | 9/2021 |
| CN | 114040303 A | 2/2022 |
| CN | 114697805 A | 7/2022 |
| CN | 115410593 A | 11/2022 |
| CN | 115567832 A | 1/2023 |
| CN | 218217617 U | 1/2023 |

OTHER PUBLICATIONS

Written Opinion for International Application No. PCT/CN2023/132757; Mailing Date, Feb. 29, 2024.

* cited by examiner

SYSTEM AND METHOD OF LARGE-SCALE NETWORKING EXTENDED CASCADED MICROPHONES

CROSS REFERENCE TO RELATED APPLICATION

The present application is a continuation-in-part application of International Patent Application No. PCT/CN2023/132757, filed date of Nov. 20, 2023, and claims priority of a Chinese Patent Application, with application No. 202211549335.X, filed on Dec. 5, 2022 to CNIPA; the contents each of which are incorporated herein by reference.

TECHNICAL FIELD

The present application relates to the technical field of networking cascaded microphone systems, and more particularly to a system and a method of large-scale networking extended cascaded microphone.

BACKGROUND

In a traditional conference room, the video conference unit is deployed, that is, a device with a speaker and an array microphone, which can be in various forms. As shown in FIG. 1, due to the limited sound picking up distance of the array microphone, cascaded microphones are usually added in order to better pick up the sound of speakers who are far away (for example, more than 3 m) from the video conference unit.

This type of cascaded microphones mainly have several problems: firstly, the synchronization problem between cascaded microphones, when a plurality of cascaded microphones and the array microphones of the video conference unit are operated together, the synchronization and comparison between each pickup unit; the pickup units such as microphones at all levels, including the microphones of the video conference unit, are each regarded as one unit. The traditional design idea is basically to use the cascaded microphones only as a physical device for picking up the sound, and all sound processing are summarized to the video conference unit to be completed, which puts forward relatively high requirements for the performance of the video conference unit, and objectively limits the maximum number of cascaded microphones, and similar products on the market are generally not more than 8 levels. Secondly, the cascaded microphones are usually Daisy chain-connected, which has certain restrictions on networking and deployment.

Another traditional scheme is to converge the plurality of microphones into the mixer, which is also limited by the interfaces of the mixer. For more and more application scenarios such as a distance education or a video conferencing, microphones are expected to be deployed in every corner of the classroom or room, and the existing system scheme will have some impact on the overall coverage effect due to the limited number of the cascaded microphones.

A Chinese Patent Application CN2021106722942 discloses a microphone cascaded system, a microphone and a terminal. The microphone cascaded system includes: a main microphone, a plurality of sub-microphones and a preset terminal;

a first network communication module is arranged in the main microphone, a second network communication module is arranged in each sub-microphone, and a third network communication module is arranged in the preset terminal; the main microphone is coupled with the first sub-microphone and the preset terminal respectively through the first network communication module and a network cable; the first sub-microphone is connected in series with other sub-microphones through their respective second network communication module and the network cable in a preset sequence;

each sub-microphone is used to obtain a first audio packet sent by a next microphone connected to the sub-microphone in the preset sequence through the second network communication module; and to send the first audio packet to the previous microphone connected to the sub-microphone in the preset sequence and the second audio packet collected based on the network transmission audio protocol;

the main microphone is used to obtain a third audio packet sent by the first sub-microphone from the first interface through the first network communication module; to obtain a mixed audio data packet according to the third audio data packet and the first audio data being collected based on the network transmission audio protocol, and to send the mixed audio data packet from the second interface to the preset terminal;

the preset terminal is used to obtain the mixed audio packet from the main microphone through the third network communication module;

the main microphone and each sub-microphone are further provided with a speaker;

the preset terminal is also used to send an audio packet to be processed to the main microphone;

the main microphone is further used to obtain the audio packet to be processed through the first network communication module; to restore the audio packet to be processed to the audio data to be processed based on the network transmission audio protocol; to play the audio data to be processed through the speaker; and to send the audio data packet to be processed from the first interface to each sub-microphone through the first network communication module; and each sub-microphone is further used to obtain the audio packet to be processed from the previous microphone connected to the sub-microphone in the preset sequence through the second network communication module; to restore the audio packet to be processed to the audio data to be processed based on the network transmission audio protocol; to play the audio data to be processed through the speaker; and to send the audio packet to be processed to the next microphone connected to the sub-microphone in the preset sequence through the second network communication module.

As shown in the specification and FIGS. 3 to 5 attached to the specification, the link structure adopted by the specification is still a series structure, which cannot achieve large-scale networking. As shown in FIG. 3, the number of microphones in the networking is also limited by the number of switch interfaces, so there are certain restrictions on networking and deployment.

SUMMARY

The technical problem to be solved in the present application is to provide a system and a method of large-scale network expanded cascaded microphones to achieve large-scale networking expanding of cascaded microphones.

The technical scheme adopted in the present application to solve the above-mentioned technical problems is to provide a system of large-scale network expanded cascaded microphones, which includes the following components:

a plurality of cascaded microphones, a cascaded Hub, and a video conference unit;

the plurality of cascaded microphones are configured for picking up a sound and completing an audio processing according to a reference audio signal received from the cascaded Hub of a superior device after the sound is picked up, and sending processed sound data to the cascaded Hub of the superior device; the cascaded Hub is configured for comparing energies after the sound data uploaded by one or more cascaded microphones of a subordinate device are received, and sending the sound data with a maximum energy to the video conference unit of the superior device; and the video conference unit is configured for picking up a sound and completing an audio processing according to an audio signal received from a personal computer as a reference audio signal after the sound is picked up, comparing an energy of the sound data after being processed with an energy of sound data sent from the cascaded Hub of the subordinate device, and selecting sound data with a greater energy and sending to the personal computer.

Preferably, the cascaded microphones include:

an audio processor, an uplink cascaded data interface, a downlink cascaded data interface, and an array microphone;

the audio processor is configured for receiving the sound data from the array microphone of the cascaded microphones, processing the sound data according to the reference audio signal received from the uplink cascaded data interface of the cascaded microphones, and comparing the an energy of the sound data after being processed with an energy of sound data from the downlink cascaded data interface of the cascaded microphones, and selecting sound data with a greater energy and sending to the uplink cascaded data interface of the cascaded microphones; and for transmitting the reference audio signal from the uplink cascaded data interface of the cascaded microphones to the downlink cascaded data interface of the cascaded microphones;

the uplink cascaded data interface is configured for receiving the reference audio signal from the superior device and sending the reference audio signal to the audio processor of the cascaded microphones, and for sending the sound data after being processed and compared by the audio processor of the cascaded microphones and the sound data to the superior device;

the downlink cascaded data interface is configured for receiving the sound data from the subordinate device and sending the sound data to the audio processor of the cascaded microphones, and for sending the reference audio signal transmitted by the audio processor of the cascaded microphones to the subordinate device; and the array microphone is configured for collecting the sound of the external sound source and transmitting the sound data to the audio processor of the cascaded microphones.

Preferably, the cascaded Hub includes:

an audio processor, an uplink cascaded data interface, and a downlink cascaded data interface;

the audio processor is configured for receiving sound data from a plurality of external downlink cascaded data interfaces and comparing energies to select sound data with a larger energy to send the sound data with the larger energy to the uplink cascaded data interface; and transmitting the reference audio signal from the uplink cascaded data interface of the cascaded Hub to the downlink cascaded data interface of the cascaded Hub;

the uplink cascaded data interface is configured for receiving the reference audio signal from the superior device to the audio processor of the cascaded Hub; and for sending the audio data after being processed and compared by the audio processor of the cascaded Hub and the sound data to the superior device; and the downlink cascaded data interface is configured for receiving the sound data from the subordinate device and sending the sound data to the audio processor of the cascaded Hub, and for sending the reference audio signal transmitted by the audio processor of the cascaded Hub to the subordinate device.

More preferably, one cascaded Hub includes a plurality of downlink cascaded data interfaces.

Preferably, the video conference unit includes:

an audio processor, a cascaded data interface, an array microphone, and a speaker;

the audio processor is configured for receiving sound data from the array microphone of the video conference unit, and completing processing of the sound data according to an audio signal received from the personal computer as the reference audio signal, comparing an energy of the sound data after being processed with an energy of sound data from the cascaded data interface of the video conference unit, and selecting sound data with a greater energy as a final collected sound data and sending to the personal computer; and further configured for sending the audio signal transmitted from an external personal computer to the cascaded data interface of the video conference unit so as to enable the audio signal to be transmitted to the subordinate device as the reference audio signal;

the cascaded data interface is configured for transmitting the reference audio signal from the audio processor of the video conference unit to the subordinate device, and for receiving the sound data from the cascaded microphones of the subordinate device and sending to the audio processor of the video conference unit;

the array microphone is configured for collecting a sound of an external sound source, and transmitting sound data to the audio processor of the video conference unit; and the speaker is configured for receiving the sound data from the audio processor of the video conference unit to make a sound.

More preferably, the audio processor of the video conference unit sends the audio data transmitted from the external personal computer to the cascaded data interface of the video conference unit for transmission to the next level device as the sound reference signal; and the audio processor of the video conference unit sends the sound data transmitted from an external personal computer to the speaker of the video conference unit.

A method of large-scale networking extended cascaded microphones, which includes the following steps:

a step 1, querying a networking situation of cascaded microphones and a cascaded Hub through broadcasting an addressing message by a video conference unit, wherein the cascaded microphones, the cascaded Hub, and the video conference unit form a networking of a triple tree structure;

Preferably, the video conference unit sends the addressing message to the cascaded microphone and the cascaded Hub.

When the cascaded microphones or cascaded Hub receives the addressing message, it will add its own flag data to the flag bit of the cascaded microphone or the cascaded Hub in the addressing message. The next cascaded microphone or cascaded Hub will add its own flag data after receiving the addressing message, traverse all devices in the networking, and the devices will add their own flag data according to their location to reply to the video conference unit. The video conference unit collects the data returned by all devices, thus a connection diagram of the entire networking is formed.

Preferably, the flag data of the next cascaded microphone or cascaded Hub is the flag data of the previous cascaded microphone or cascaded Hub plus 1.

More preferably, the video conference unit regularly sends the addressing message to obtain networking situation in a real-time.

a step 2, completing an audio processing according to a reference audio signal received from the cascaded Hub of a superior device after the networking is completed and a sound is picked up by the array microphone of a last level of the cascaded microphones, and sending processed audio data to the cascaded Hub of the superior device;

a step 3, completing the audio processing according to a reference audio signal received from the cascaded Hub of a superior device after the sound is picked up by an array microphone of the cascaded microphones of an intermediate level, and comparing an energy of the sound data after being processed with an energy of sound data sent from the cascaded microphones of the subordinate device, and selecting sound data with a greater energy and sending to the cascaded Hub of the superior device;

a step 4, comparing energies after the cascaded Hub receives the sound data uploaded by one or more cascaded microphones of a subordinate device, and sending, through the cascaded Hub, the sound data with a maximum energy to the video conference unit of the superior device;

a step 5, completing, through the array microphone of the cascaded microphones of the video conference unit, the audio processing according to an audio signal received from a personal computer as a reference audio signal after the sound is picked up, comparing an energy of the sound data after being processed with an energy of sound data sent from the cascaded Hub of the subordinate device, and selecting sound data with a greater energy and sending to the personal computer.

Beneficial Effects

The beneficial effect of the present application is that the cascaded microphones, the cascaded Hub, and the video conference unit form a networking of a triple tree structure, which can be freely expanded, thereby achieving the expansion of the cascaded microphone system at any level of scale. By using the system of large-scale networking expanded cascaded microphones of the present application, it is possible to achieve large-scale networking expanding of the cascaded microphones, thus the requirements of large-scale deployment of cascaded microphones in large conference rooms or classrooms are achieved. The triple tree structure networking is beneficial for covering various types of conference rooms, especially those with multiple rows of seats and classrooms.

BRIEF DESCRIPTION OF THE DRAWINGS

The following is a further explanation of the present application in conjunction with the accompanying drawings.

DETAILED DESCRIPTION OF EMBODIMENTS

The technical solution in the embodiments of the present application will be clearly and completely described in conjunction with the accompanying drawings. Obviously, the described embodiments are only a part of the embodiments of the present application, not all of them. Based on the embodiments in the present application, all other embodiments obtained by those skilled in the art are within the scope of protection of the present application.

Figure 1:
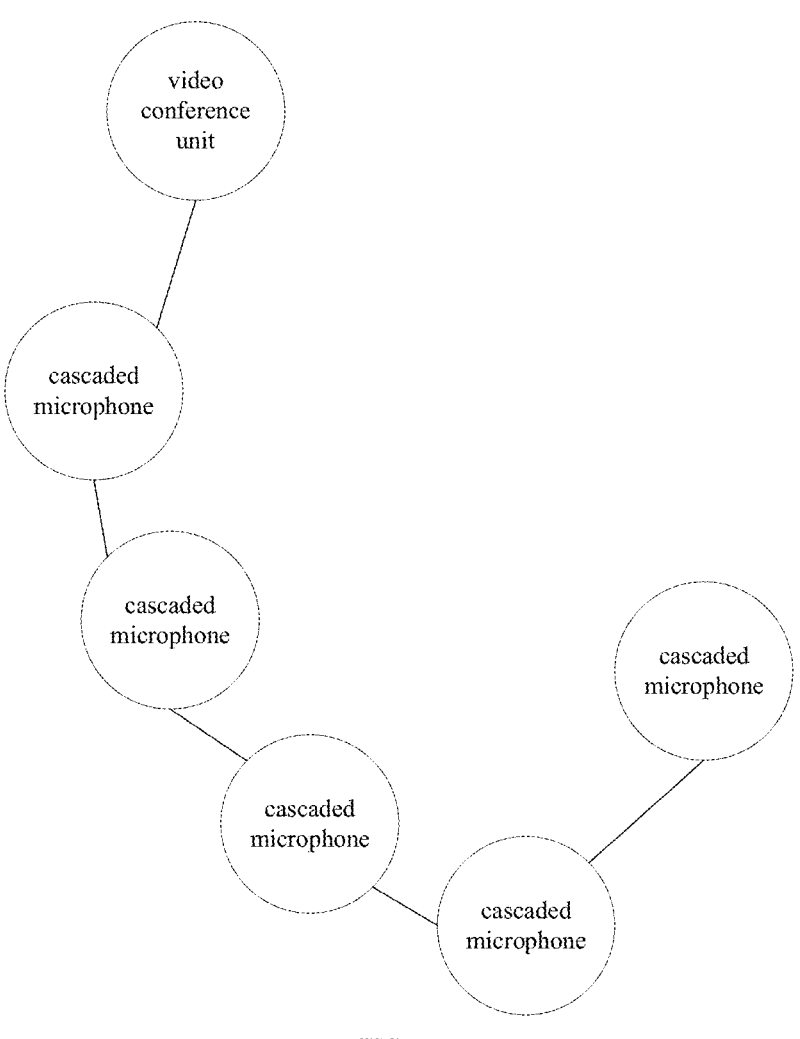
FIG. 1 is a networking structure of an existing cascaded microphone system.
Figures 2, 3:
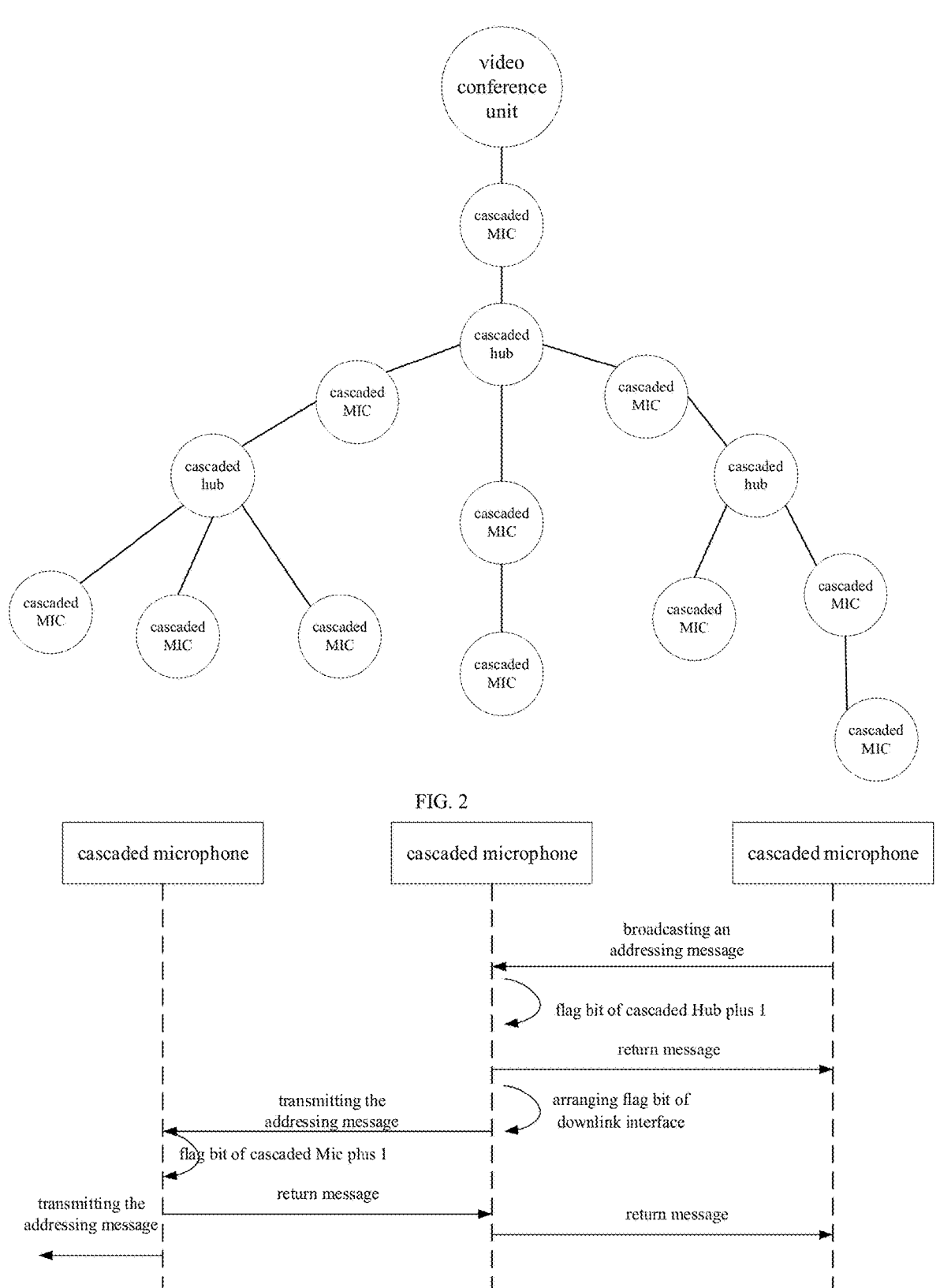
FIG. 2 is a networking structure of a cascaded microphone system of the present application.
FIG. 3 is a network addressing flowchart of a cascaded microphone system of the present application.

As shown in FIG. 2, a system of large-scale networking expanded cascaded microphones, which includes the following components:

a plurality of cascaded microphones, which are configured for picking up a sound and completing an audio processing according to a reference audio signal received from the cascaded Hub of a superior device after the sound is picked up, and sending processed sound data to the cascaded Hub of the superior device;

a cascaded Hub, which is configured for comparing energies after the sound data uploaded by one or more cascaded microphones of a subordinate device are received, and sending the sound data with a maximum energy to the video conference unit of the superior device; and a video conference unit, which is configured for picking up a sound and completing an audio processing according to an audio signal received from a personal computer as a reference audio signal after the sound is picked up, comparing an energy of the sound data after being processed with an energy of sound data sent from the cascaded Hub of the subordinate device, and selecting sound data with a greater energy and sending to the personal computer.

Figure 4:
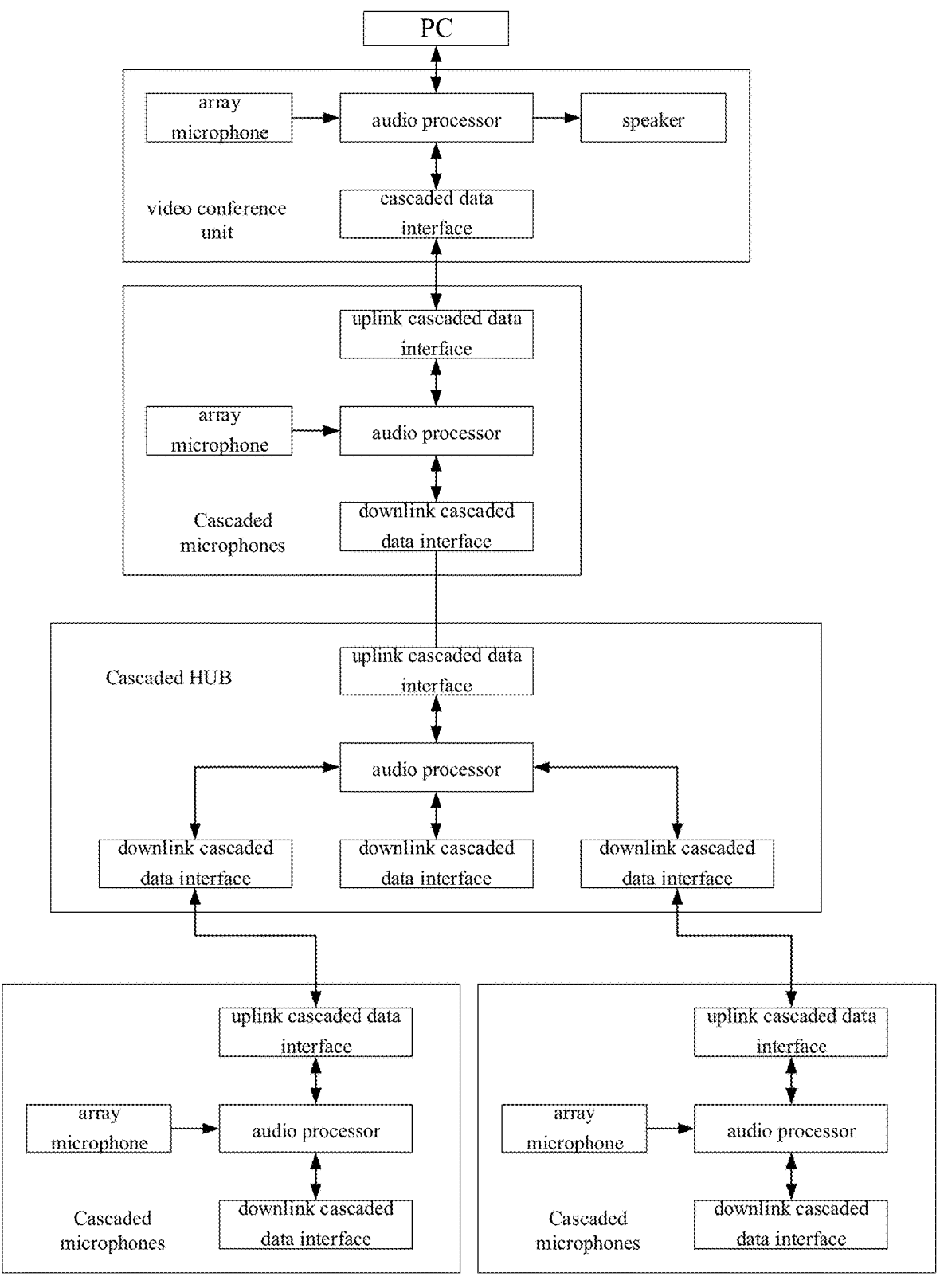
FIG. 4 is a framework diagram of a cascaded microphone system of the present application.

Specifically, as an optional implementation in the embodiment, as shown in FIG. 4, the cascaded microphones include: an audio processor, an uplink cascaded data interface, a downlink cascaded data interface, and an array microphone;

the audio processor is configured for receiving the sound data from the array microphone of the cascaded microphones, processing the sound data according to the reference audio signal received from the uplink cascaded data interface of the cascaded microphones, and comparing the an energy of the sound data after being processed with an energy of sound data from the downlink cascaded data interface of the cascaded microphones, and selecting sound data with a greater energy and sending to the uplink cascaded data interface of the cascaded microphones; and for transmitting the reference audio signal from the uplink cascaded data interface of the cascaded microphones to the downlink cascaded data interface of the cascaded microphones;

the uplink cascaded data interface is configured for receiving the reference audio signal from the superior device and sending the reference audio signal to the audio processor of the cascaded microphones, and for sending the audio data after being processed and compared by the audio processor of the cascaded microphones and the sound data to the superior device;

the downlink cascaded data interface is configured for receiving the sound data from the subordinate device and sending the sound data to the audio processor of the cascaded microphones, and for sending the reference audio signal transmitted by the audio processor of the cascaded microphones to the subordinate device; and the array microphone is configured for collecting the sound of the external sound source and transmitting the sound data to the audio processor of the cascaded microphones.

specifically, as an optional implementation in the embodiment, as shown in FIG. 4, the cascaded Hub includes: an audio processor, an uplink cascaded data interface, and a downlink cascaded data interface;

the audio processor is configured for receiving sound data from a plurality of external downlink cascaded data interfaces and comparing energies to select sound data with a larger energy to send the sound data with the larger energy to the uplink cascaded data interface; and transmitting the reference audio signal from the uplink cascaded data interface of the cascaded Hub to the downlink cascaded data interface of the cascaded Hub;

the uplink cascaded data interface is configured for receiving the reference audio signal from the superior device to the audio processor of the cascaded Hub; and for sending the audio data after being processed and compared by the audio processor of the cascaded Hub and the sound data to the superior device; and the downlink cascaded data interface is configured for receiving the sound data from the subordinate device and sending the sound data to the audio processor of the cascaded Hub, and for sending the reference audio signal transmitted by the audio processor of the cascaded Hub to the subordinate device.

Specifically, as an optional implementation in the embodiment, as shown in FIG. 4, one cascaded Hub includes a plurality of downlink cascaded data interfaces.

Specifically, as an optional implementation in the embodiment, as shown in FIG. 4, the video conference unit includes: an audio processor, a cascaded data interface, an array microphone, and a speaker;

the audio processor is configured for receiving sound data from the array microphone of the video conference unit, and completing processing of the sound data according to an audio signal received from the personal computer as the reference audio signal, comparing an energy of the sound data after being processed with an energy of sound data from the cascaded data interface of the video conference unit, and selecting sound data with a greater energy as a final collected sound data and sending to the personal computer; and further configured for sending the audio signal transmitted from an external personal computer to the cascaded data interface of the video conference unit so as to enable the audio signal to be transmitted to the subordinate device as the reference audio signal;

the cascaded data interface is configured for transmitting the reference audio signal from the audio processor of the video conference unit to the subordinate device, and for receiving the sound data from the cascaded microphones of the subordinate device and sending to the audio processor of the video conference unit;

the array microphone is configured for collecting a sound of an external sound source, and transmitting sound data to the audio processor of the video conference unit; and the speaker is configured for receiving the sound data from the audio processor of the video conference unit to make a sound.

Specifically, as an optional implementation in the embodiment, as shown in FIG. 4, the audio processor of the video conference unit sends the audio data transmitted from the external personal computer to the cascaded data interface of the video conference unit for transmission to the next level device as the sound reference signal; and the audio processor of the video conference unit sends the sound data transmitted from the external personal computer to the speaker of the video conference unit.

As shown in FIG. 4, the cascaded microphone has one uplink cascaded data interface as the uplink interface and one downlink cascaded data interface as the downlink interface. Compared with traditional cascaded microphones, in addition to completing the collection of sound picking up, it also supports the function of locally audio processing and comparing the energies of the sound data uploaded by the subordinate device and then sending sound data with a greater energy to the uplink interface.

The cascaded hub has one uplink cascaded data interface as the uplink interface and a plurality of downlink cascaded data interfaces as the downlink interface, in the embodiment, three downlink cascaded data interfaces are used as the downlink interface, and the actual number is not limited to this. The cascaded hub itself does not have an array microphone, which obtains sound data uploaded from the plurality of downlink interfaces, and sends sound data with a greater energy to the uplink interface after energy comparison is completed.

The cascaded microphones and the cascaded hub can be located at any level in the networking, as shown in FIG. 2, the cascaded microphones, the cascaded Hub, and the video conference unit form a networking of a triple tree structure, which can be freely expanded, thereby achieving the expansion of the cascaded microphone system at any level of scale. By using the system of large-scale networking expanded cascaded microphones of the present application, it is possible to achieve large-scale networking expanding of the cascaded microphones, thus the requirements of large-scale deployment of cascaded microphones in large conference rooms or classrooms are satisfied. The triple tree structure networking is beneficial for covering various types of conference rooms, especially those with multiple rows of seats and classrooms.

Figure 5:
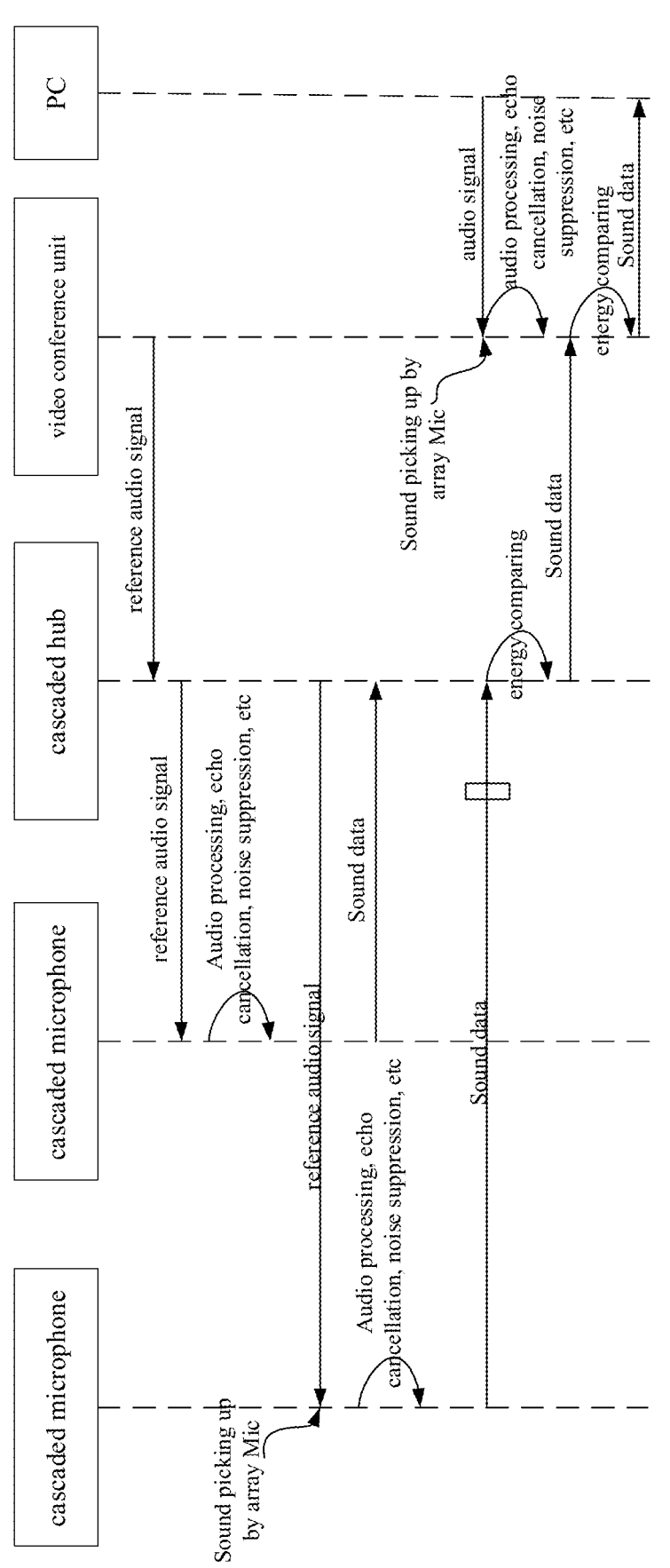
FIG. 5 is an overall flowchart of a cascaded microphone method of the present application.

As shown in FIG. 5, a method of large-scale networking extended cascaded microphones, which includes the following steps:

In a step 1, querying a networking situation of cascaded microphones and a cascaded Hub through broadcasting an addressing message by a video conference unit, wherein the cascaded microphones, the cascaded Hub, and the video conference unit form a networking of a triple tree structure;

Specifically, as an optional implementation in the embodiment, as shown in FIG. 3, the video conference unit sends the addressing message to the cascaded microphone and the cascaded Hub. When the cascaded microphones or cascaded Hub receives the addressing message, it will add its own flag data to the flag bit of the cascaded microphone or the cascaded Hub in the addressing message. The next cascaded microphone or cascaded Hub will add its own flag data after receiving the addressing message, traverse all devices in the networking, and the devices will add their own flag data according to their location to reply to the video conference unit. The video conference unit collects the data returned by all devices.

Specifically, as an optional implementation in the embodiment, as shown in FIG. 3, the flag data of the next cascaded microphone or cascaded Hub is the flag data of the previous cascaded microphone or cascaded Hub plus 1.

Specifically, as an optional implementation in the embodiment, as shown in FIG. 3, the video conference unit regularly sends the addressing message.

The video conference unit queries the networking situation of the cascaded microphones through broadcast messages. Due to the triple tree structure, the cascaded microphones will increase the flag bit of the cascaded microphones in the message by 1 when receiving the message; this way, the next cascaded microphone will increase by 1 after receiving the message, and so on. After the message arrives at the cascaded Hub, the flag bit of the cascaded Hub will be increased by 1, and when forwarding to the lower level interface of the cascaded Hub, then differentiate the positions of the lower level interfaces in the cascaded Hub, for example, the first lower level interface is 1, the second lower level interface is 2, and the third lower level interface is 3; and so on, so that all devices in the networking can be traversed, and the devices add their own flag data based on the messages replied by their positions; the video conference unit can generate a networking diagram with a triple tree structure by collecting data from all devices, thereby intuitively understanding the networking scale. Furthermore, the video conference unit manages the entire extended cascaded microphone system by regularly querying messages to identify the failure points of the networking and new changes.

For example, for the next flag bit, the cascaded Hub occupies 2 bytes, the downlink interface occupies 1 byte, and the cascaded microphone occupies 2 bytes; when there are 3 downlink interfaces, if the system is a pure cascaded microphones networking, it can support a maximum of 255 cascaded microphones; if there are cascaded hubs in the system, the networking scale can reach up to $255*3*255=195075$; if the flag bits are extended, more quantities will be supported.

In a step 2, completing an audio processing according to a reference audio signal received from the cascaded Hub of a superior device after the networking is completed and a sound is picked up by the array microphone of a last level of the cascaded microphones, and sending processed audio data to the cascaded Hub of the superior device;

In a step 3, completing the audio processing according to a reference audio signal received from the cascaded Hub of a superior device after the sound is picked up by an array microphone of the cascaded microphones of an intermediate level, and comparing an energy of the sound data after being processed with an energy of sound data sent from the cascaded microphones of the subordinate device, and selecting sound data with a greater energy and sending to the cascaded Hub of the superior device;

In a step 4, comparing energies after the cascaded Hub receives the sound data uploaded by one or more cascaded microphones of a subordinate device, and sending, through the cascaded Hub, sound data with a maximum energy to the video conference unit of the superior device;

In a step 5, completing, through the array microphone of the cascaded microphones of the video conference unit, the audio processing according to an audio signal received from a personal computer as a reference audio signal after the sound is picked up, comparing an energy of the sound data after being processed with an energy of sound data sent from the cascaded Hub of the subordinate device, and selecting sound data with a greater energy and sending to the personal computer.

By using the method of large-scale networking expanded cascaded microphones in the present application, a microphone Hub can be used to achieve three-way tree shaped addressing and audio data uplink and downlink transmission, thereby achieving large-scale networking and meeting the requirements of large-scale deployment of cascaded microphones in large conference rooms or classrooms.

It should be noted that in the present application, the technical features of each optional solution can be combined to form a solution as long as they are not contradictory, and these solutions are all within the scope of disclosure in the present application. Relationship terms such as first and second are only used to distinguish one entity or operation from another entity or operation, without necessarily requiring or implying any actual relationship or order between these entities or operations. Moreover, the terms "including", "containing", or any other variation thereof are intended to encompass non exclusive inclusion, such that a process, method, item, or device that includes a series of elements not only includes those elements, but also includes other elements that are not explicitly listed, or also includes elements inherent to such process, method, item, or device. Without further limitations, the elements limited by the statement "including one . . . " do not exclude the existence of other identical elements in the process, method, item, or device that includes the said elements.

The various embodiments in the description are described in relevant ways, and each embodiment focuses on the differences from other embodiments. The same and similar parts between each embodiment can be referred to each other. The above is only a preferred embodiment of the present application and is not intended to limit the scope of protection of the present application. Any modifications, equivalent replacements, improvements, etc. made within the spirit and principles of the present application are included within the scope of protection of the present application.

What is claimed is:

1. A system of large-scale networking extended cascaded microphones, comprising:
   a plurality of cascaded microphones, a cascaded Hub, and a video conference unit;
   wherein the plurality of cascaded microphones are configured for picking up a sound and completing an audio processing according to a reference audio signal received from the cascaded Hub of a superior device after the sound is picked up, and sending sound data being processed to the cascaded Hub of the superior device;
   wherein the cascaded Hub is configured for comparing energies after the sound data uploaded by one or more of the plurality of cascaded microphones of a subordinate device are received, and sending the sound data with a maximum energy to the video conference unit of the superior device; and wherein the video conference unit is configured for picking up a sound and completing an audio processing according to an audio signal received from a personal computer as a reference audio signal after the sound is picked up, comparing an energy of the sound data after being processed with an energy of sound data sent from the cascaded Hub of the subordinate device, and selecting sound data with a greater energy and sending to the personal computer;

wherein the video conference unit comprises:

an audio processor, a cascaded data interface, an array microphone, and a speaker;

wherein the audio processor is configured for receiving the sound data from the array microphone of the video conference unit, and completing processing of the sound data according to an audio signal received from the personal computer as the reference audio signal, comparing an energy of the sound data after being processed with an energy of the sound data from the cascaded data interface of the video conference unit, and selecting sound data with a greater energy as a final collected sound data and sending to the personal computer; and further configured for sending the audio signal transmitted from an external personal computer to the cascaded data interface of the video conference unit so as to enable the audio signal to be transmitted to the subordinate device as the reference audio signal;

wherein the cascaded data interface is configured for transmitting the reference audio signal from the audio processor of the video conference unit to the subordinate device, and for receiving the sound data from cascaded microphones of the subordinate device and sending to the audio processor of the video conference unit;

wherein the array microphone is configured for collecting a sound of an external sound source, and transmitting sound data to the audio processor of the video conference unit; and wherein the speaker is configured for receiving the sound data from the audio processor of the video conference unit to make a sound.

2. The system of large-scale networking extended cascaded microphones according to claim 1, wherein one of the plurality of cascaded microphones comprise:

an audio processor, an uplink cascaded data interface, a downlink cascaded data interface, and an array microphone;

wherein the audio processor is configured for receiving the sound data from the array microphone of the cascaded microphones, processing the sound data according to the reference audio signal received from the uplink cascaded data interface of the cascaded microphones, and comparing the an energy of the sound data after being processed with an energy of sound data from the downlink cascaded data interface of the cascaded microphones, and selecting sound data with a greater energy and sending to the uplink cascaded data interface of the cascaded microphones; and for transmitting the reference audio signal from the uplink cascaded data interface of the cascaded microphones to the downlink cascaded data interface of the cascaded microphones;

wherein the uplink cascaded data interface is configured for receiving the reference audio signal from the superior device and sending the reference audio signal to the audio processor of the cascaded microphones, and for sending the sound data after being processed and compared by the audio processor of the cascaded microphones to the superior device;

wherein the downlink cascaded data interface is configured for receiving the sound data from the subordinate device and sending the sound data to the audio processor of the cascaded microphones, and for sending the reference audio signal transmitted by the audio processor of the cascaded microphones to the subordinate device; and wherein the array microphone is configured for collecting the sound of the external sound source and transmitting the sound data to the audio processor of the cascaded microphones.

3. The system of large-scale networking extended cascaded microphones according to claim 1, wherein the cascaded Hub comprises:

an audio processor, an uplink cascaded data interface, and a downlink cascaded data interface;

wherein the audio processor is configured for receiving sound data from a plurality of external downlink cascaded data interfaces and comparing energies to select sound data with a larger energy to send the sound data with the larger energy to the uplink cascaded data interface; and transmitting the reference audio signal from the uplink cascaded data interface of the cascaded Hub to downlink cascaded data interface of the cascaded Hub;

wherein the uplink cascaded data interface is configured for receiving the reference audio signal from the superior device to the audio processor of the cascaded Hub; and for sending the audio data after being processed and compared by the audio processor of the cascaded Hub and the sound data to the superior device; and wherein the downlink cascaded data interface is configured for receiving the sound data from the subordinate device and sending the sound data to the audio processor of the cascaded Hub, and for sending the reference audio signal transmitted by the audio processor of the cascaded Hub to the subordinate device.

4. The system of large-scale networking extended cascaded microphones according to claim 3, wherein one cascaded Hub comprises a plurality of downlink cascaded data interfaces.

5. The system of large-scale networking extended cascaded microphones according to claim 1, wherein the audio processor of the video conference unit sends the sound data transmitted from the external personal computer to the speaker of the video conference unit.

6. A method of large-scale networking extended cascaded microphones, comprising:

step 1, querying a networking situation of cascaded microphones and a cascaded Hub through broadcasting an addressing message by a video conference unit, wherein the cascaded microphones, the cascaded Hub, and the video conference unit form a networking of a triple tree structure;

step 2, completing an audio processing according to a reference audio signal received from the cascaded Hub of a superior device after the networking is completed and a sound is picked up by an array microphone of a last level of the cascaded microphones, and sending processed audio data to the cascaded Hub of the superior device;

step 3, completing the audio processing according to a reference audio signal received from the cascaded Hub of a superior device after the sound is picked up by an array microphone of the cascaded microphones of an intermediate level, and comparing an energy of the sound data after being processed with an energy of sound data sent from the cascaded microphones of a subordinate device, and selecting sound data with a greater energy and sending to the cascaded Hub of the superior device;

step 4, comparing energies after the cascaded Hub receives the sound data uploaded by one or more cascaded microphones of a subordinate device, and sending, through the cascaded Hub, the sound data with a maximum energy to the video conference unit of the superior device;

step 5, completing, through the array microphone of the cascaded microphones of the video conference unit, the audio processing according to an audio signal received from a personal computer as a reference audio signal after the sound is picked up, comparing an energy of the sound data after being processed with an energy of sound data sent from the cascaded Hub of the subordinate device, and selecting sound data with a greater energy and sending to the personal computer.

7. The method of large-scale networking extended cascaded microphones according to claim 6, wherein the video conference unit periodically sends addressing messages to obtain the networking situation in a real time.

\* \* \* \* \*